US011975337B2

(12) United States Patent
Kelsey

(10) Patent No.: US 11,975,337 B2
(45) Date of Patent: May 7, 2024

(54) GYRATORY ROLLER CRUSHER

(71) Applicant: CBSM MINING SERVICES PTY LTD, Camden Park (AU)

(72) Inventor: Christopher Kelsey, Hope Forest (AU)

(73) Assignee: CBSM MINING SERVICES PTY LTD, Camden Park (AU)

( * ) Notice: Subject to any disclaimer, the term of this patent is extended or adjusted under 35 U.S.C. 154(b) by 0 days.

(21) Appl. No.: 18/041,705

(22) PCT Filed: Sep. 10, 2021

(86) PCT No.: PCT/AU2021/051052
§ 371 (c)(1),
(2) Date: Feb. 15, 2023

(87) PCT Pub. No.: WO2022/051817
PCT Pub. Date: Mar. 17, 2022

(65) Prior Publication Data

US 2023/0311131 A1 Oct. 5, 2023

(30) Foreign Application Priority Data

Sep. 11, 2020 (AU) ................................ 2020903268

(51) Int. Cl.
*B02C 4/02* (2006.01)
*B02C 4/08* (2006.01)
*B02C 4/10* (2006.01)
*B02C 4/32* (2006.01)

(52) U.S. Cl.
CPC .................. *B02C 4/32* (2013.01); *B02C 4/02* (2013.01); *B02C 4/08* (2013.01); *B02C 4/10* (2013.01)

(58) Field of Classification Search
CPC .... B02C 4/02; B02C 4/08; B02C 4/30; B02C 4/32
See application file for complete search history.

(56) References Cited

U.S. PATENT DOCUMENTS 183,114 A 10/1876 Blake
256,678 A 4/1882 Hause
3,964,718 A * 6/1976 Balistrieri ................. B02C 4/02 241/234
4,366,928 A 1/1983 Hughes
5,595,350 A 1/1997 Massaro, Jr. et al.
8,991,144 B2 * 3/2015 Clauss ................... A01D 43/10 56/16.4 C
9,833,785 B2 * 12/2017 Den Boer ............ B23K 26/342
2009/0020637 A1 1/2009 Raaz et al.
2020/0197946 A1 * 6/2020 Yoon ......................... B02C 4/08

FOREIGN PATENT DOCUMENTS

DE 10066100 A1 * 1/2003 ............... B02C 1/02

* cited by examiner

*Primary Examiner* — Faye Francis
(74) *Attorney, Agent, or Firm* — Sand, Sebolt & Wernow Co., LPA

(57) ABSTRACT

A gyratory roller crusher in which the rollers have a corrugated profile and at least one of the rollers is eccentrically mounted to give a relative gyratory motion to the rollers. The arrangement in the gyratory roller crusher results in additional breakage mechanisms for the comminution of a very wide range of feed material, vastly improved crushing ratios and increased throughput.

5 Claims, 9 Drawing Sheets

GYRATORY ROLLER CRUSHER

FIELD OF THE INVENTION

The present invention relates to machinery for the comminution of material, in particular roller crushers.

BACKGROUND TO THE INVENTION

Roller crushers for the comminution of material such as high pressure grinding rolls (HPGRs) are advantageous in being relatively simple and capable of being scaled easily to handle high throughputs. They do however have some limitations.

HPGRs rely predominantly on inter-particle compression breakage to comminute material as it is drawn between two rollers. This is less energy efficient than other breakage mechanisms or such as those produced by gyratory crushers.

HPGRs in practise have a limited crushing ratio with practical implementations achieving a 3:1 crushing ratio. For many applications this necessitates the use of multiple crushing stages.

The output from HPGRs is also less than ideal when the feed is moist, being in the form of a compressed ribbon of material. Such a ribbon usually requires breaking up before it can be processed in other equipment.

The object of this invention is to provide a roller crusher to alleviate the above problems, or at least provide the public with a useful alternative.

SUMMARY OF THE INVENTION

In a first aspect the invention provides a roller crusher for the comminution of material, comprising a first roller and a second roller positioned in parallel with each other to define a crushing gap, wherein each roller has a complementary corrugated profile, and wherein the crusher is configured such that in operation there is a relative gyratory motion between the first roller and second roller to vary the size of the crushing gap.

Preferably the first roller is a driven roller and the second roller is an idle roller, however both of the rollers may be driven.

In preference at least one of the rollers is eccentrically mounted to produce the relative gyratory motion between the rollers.

Preferably the idle roller is eccentrically mounted to and rotationally mounted to a shaft, such that rotation of the shaft results in gyratory motion of the idle roller.

In preference the idle roller is also resiliently mounted.

Preferably the frequency of the gyratory motion is at least 100 times greater than the rotational frequency of the rollers.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DRAWING COMPONENTS

Figure 1:
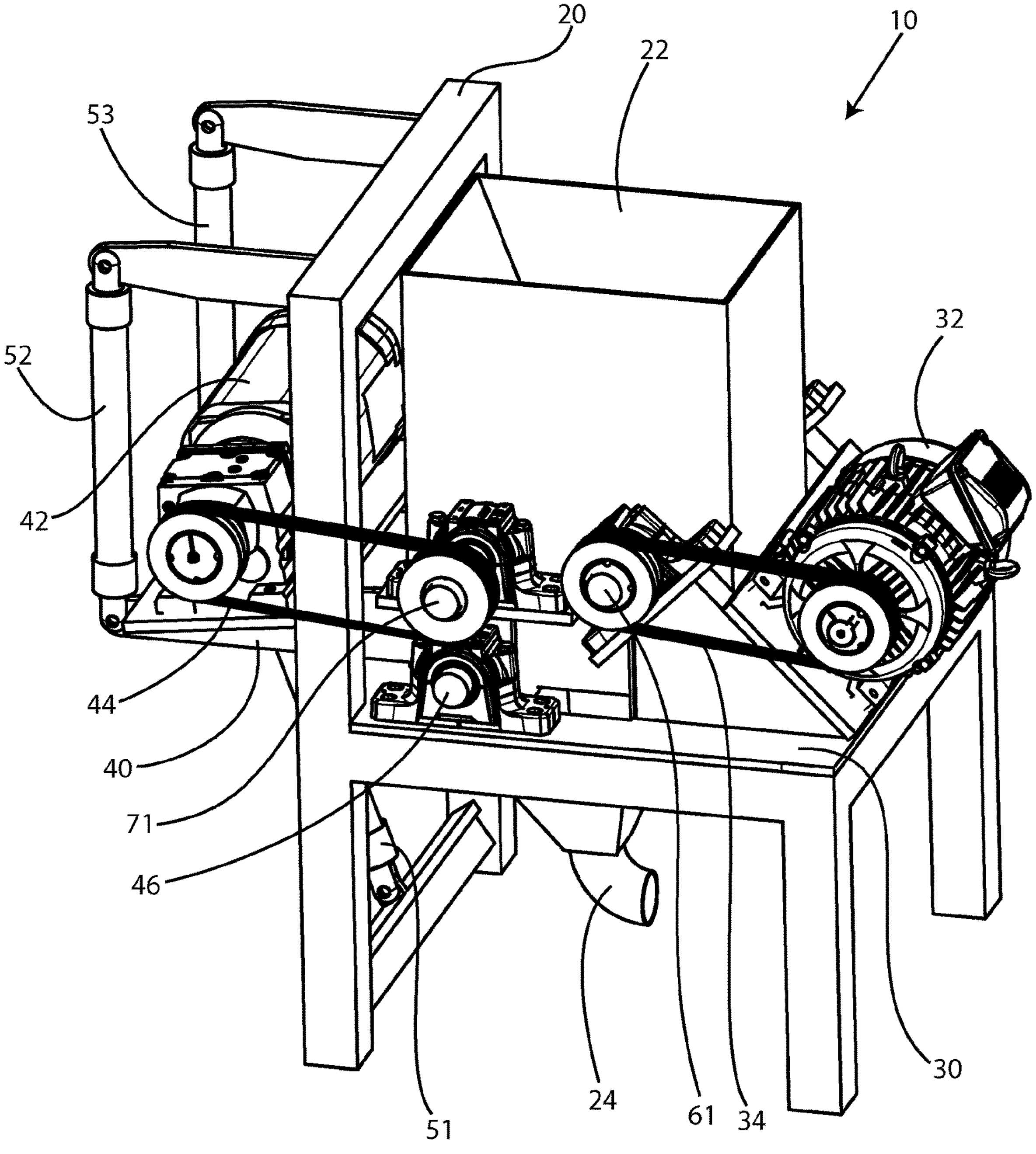
FIG. 1 shows a perspective view of a gyratory roller crusher incorporating the present invention.

The drawings include the following integers.

10 crusher
20 frame
22 feed hopper
24 product chute
30 fixed table
32 drive motor
34 belt
40 pivoting table
42 gyratory motor
44 belt
46 pivot shaft
51, 52, 53 air muscles
60 driven roller
61 shaft
62 top flat
63 bottom flat
64 angled face
70 idle roller

DETAILED DESCRIPTION OF THE INVENTION

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

The present invention provides a roller crusher with two main differences to conventional roller crushers. The first difference is having a relative gyratory motion between the rollers. The second difference is to use corrugated rollers. The corrugated rollers give a larger crushing area and in combination with the gyratory action provide additional comminution compression and shearing mechanisms to give a vastly improved crushing ratio. The crusher applies compression and shear forces to a packed particle bed. The breakage mechanisms initiated by these forces include impact breakage, inter-particle compression, induced tensile failure and particle shear forces generated by a gyrating roll.

In a first embodiment of the invention a first roller is driven and a second roller idles and is given an induced rotational motion by its contact with the material passing between the rollers. The second roller is movable with respect to the first roller to set a nominal crushing gap between the rollers, and is also eccentrically mounted to give a relative gyratory motion between the two rollers. The gyratory motion periodically varies the size of the crushing gap.

Figure 2:
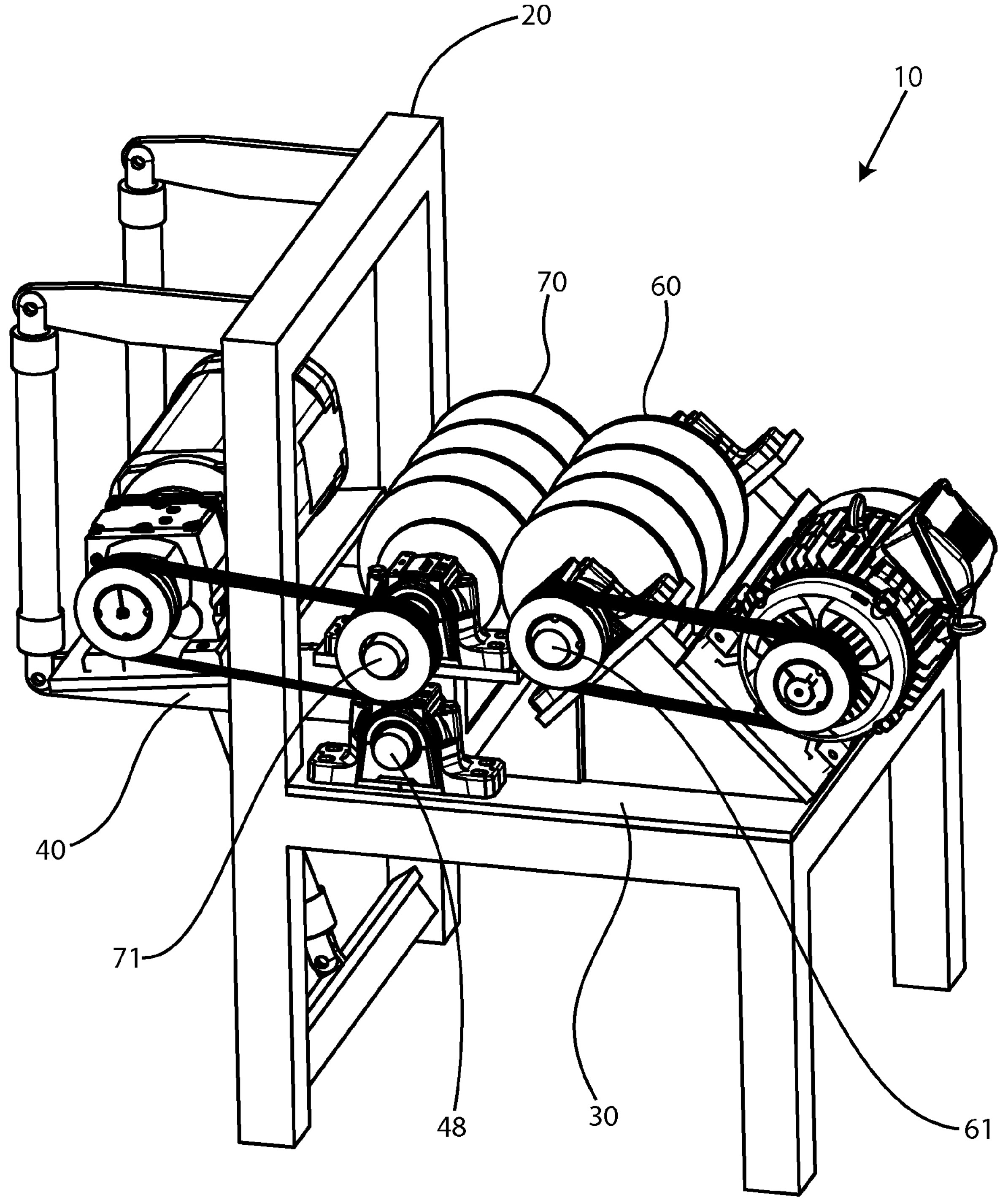
FIG. 2 shows a first perspective view the crusher with the feed hopper removed to reveal the rollers.

FIGS. 1 and 2 show a perspective view of a roller crusher 10 incorporating the invention according to the first embodiment of the invention. For representational convenience the crusher is shown in isolation without well-known components such as input feeds and product extraction. FIG. 2 differs from FIG. 1 in that the input hopper 22 that guides material to be crushed onto the rollers has been removed to show the rollers. The crusher 10 includes a frame 20 supporting a driven roller 60 via fixed table 30 and an intermeshed idle roller 70 via pivoting table 40, which is pivotally mounted to the frame via pivot shaft 46. Air muscles (or other similar devices) 51, 52 and 53 acting between the frame 20 and the pivoting table 40 allow for movement of the pivoting table which in turn varies the gap between the idle roller 70 and the driven roller 60. The air muscles provide a compression force between the rollers and provide a resilient mount for the idle roller to act as a relief mechanism to prevent the rollers from jamming. The driven roller 60 is mounted on shaft 61 and driven by a drive motor 32 via belts 34 and associated pulleys. Other drive mechanisms such as chains or direct drives with gears may be used depending on power transmission requirements which will be largely determined by the throughput of the crusher. The idle roller 70 is rotatably and eccentrically mounted on shaft 71 to provide an eccentric motion resulting in a relative gyratory motion between the two rollers. The eccentricity is too small to be discerned in the Figures. The shaft 71 is driven by a gyratory motor 42 via belts 44 and associated pulleys. Product is discharged from the crusher via chute 24.

Figure 3:
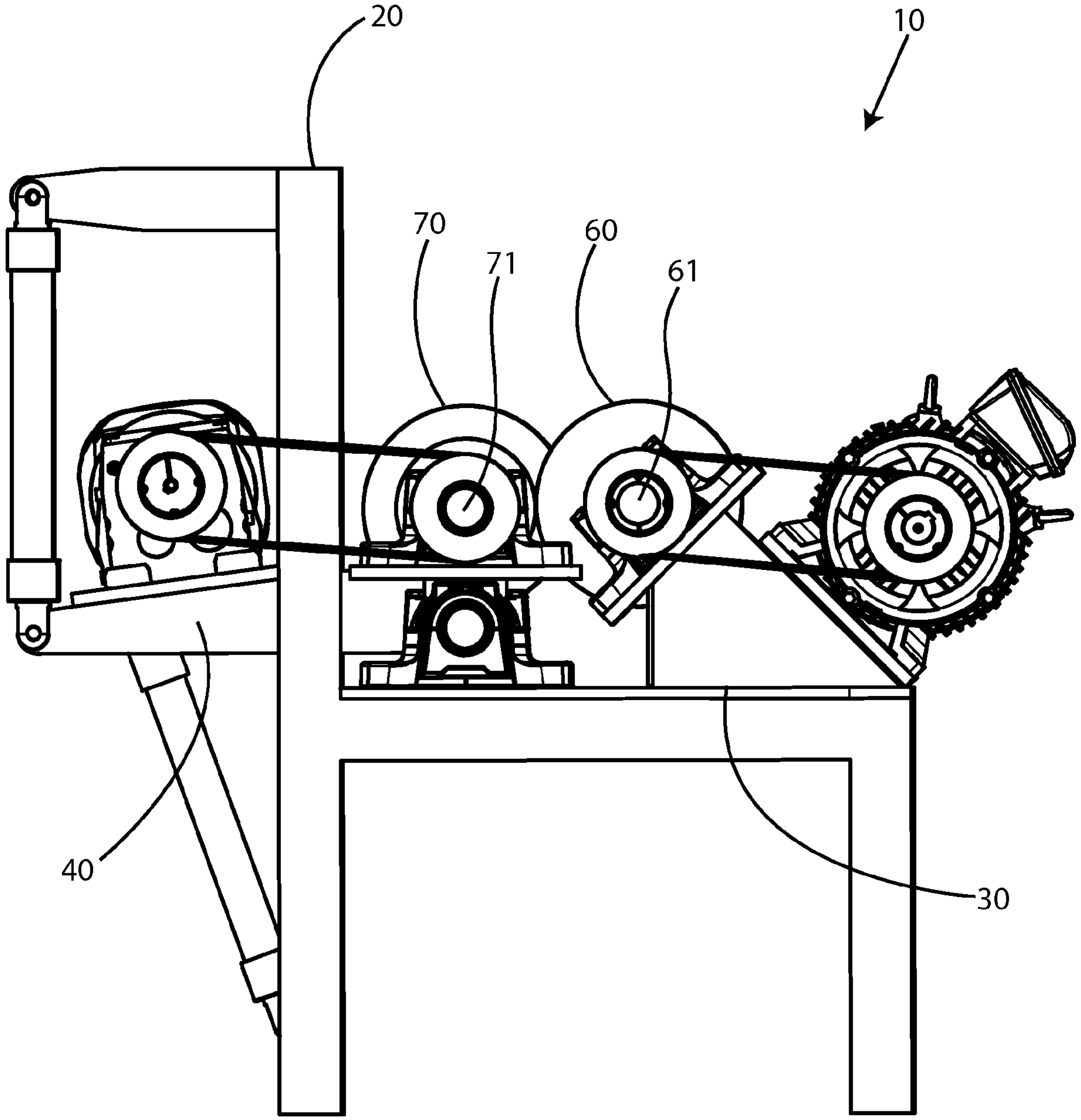
FIG. 3 shows a side view of the crusher with the hopper removed.
Figure 4:
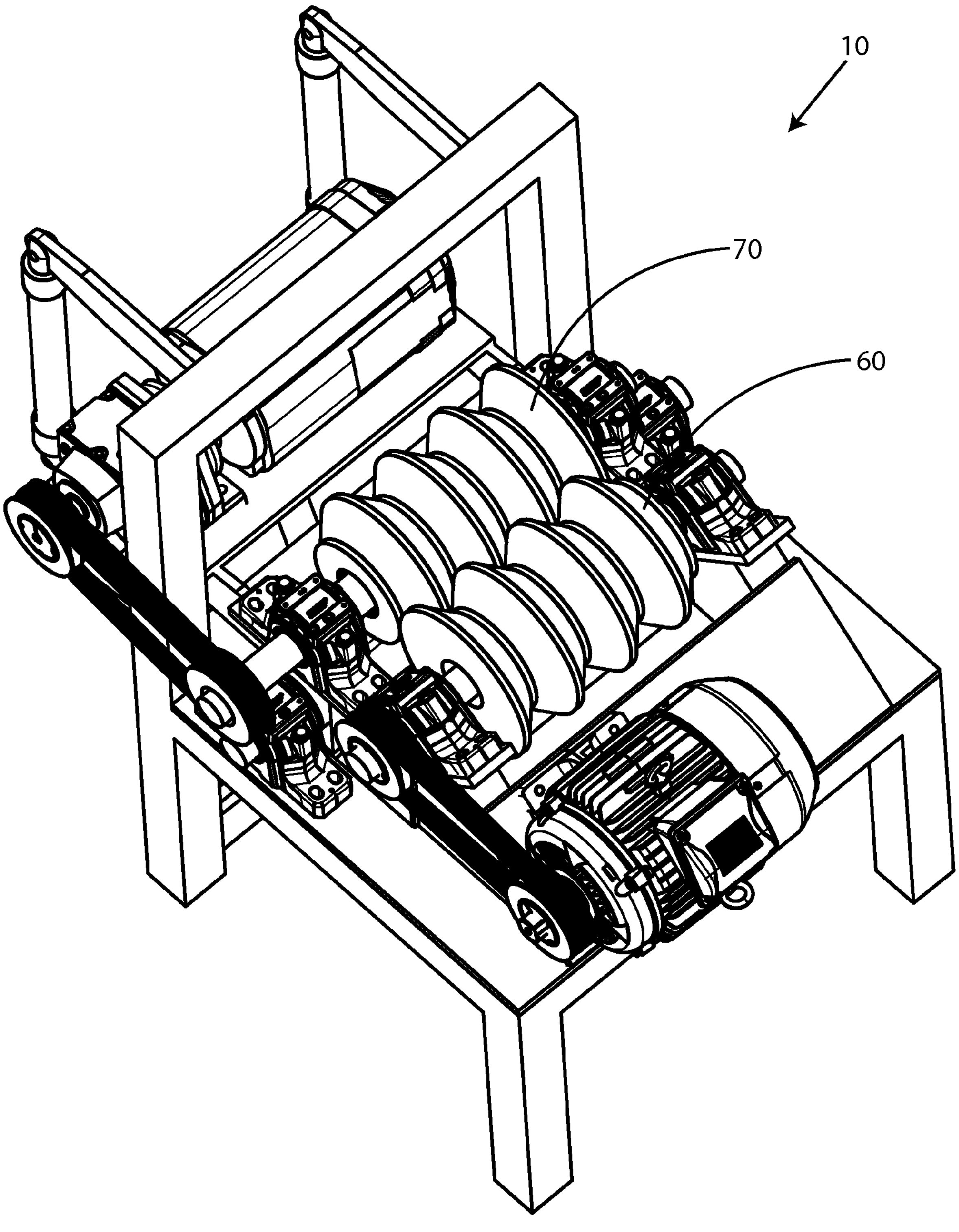
FIG. 4 shows a second perspective view the crusher with the feed hopper removed to show how the rollers intermesh.

FIG. 3 provides a side view of the crusher 10, whilst FIG. 4 provides a further perspective view that enables the intermeshing of the rollers to be better seen.

Figure 5:
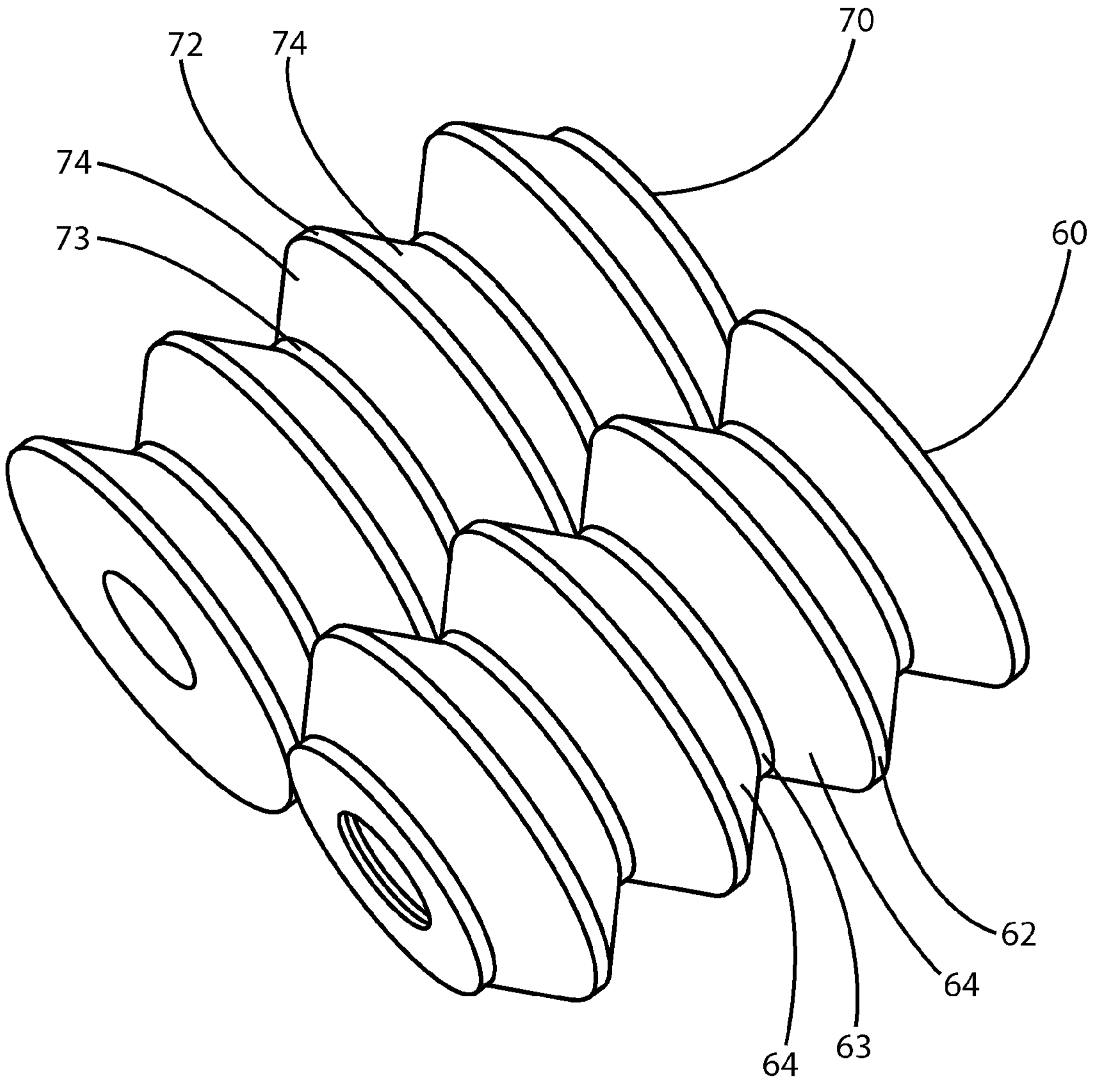
FIG. 5 shows an isolated perspective view of the rollers of the invention intermeshed.
Figure 6:
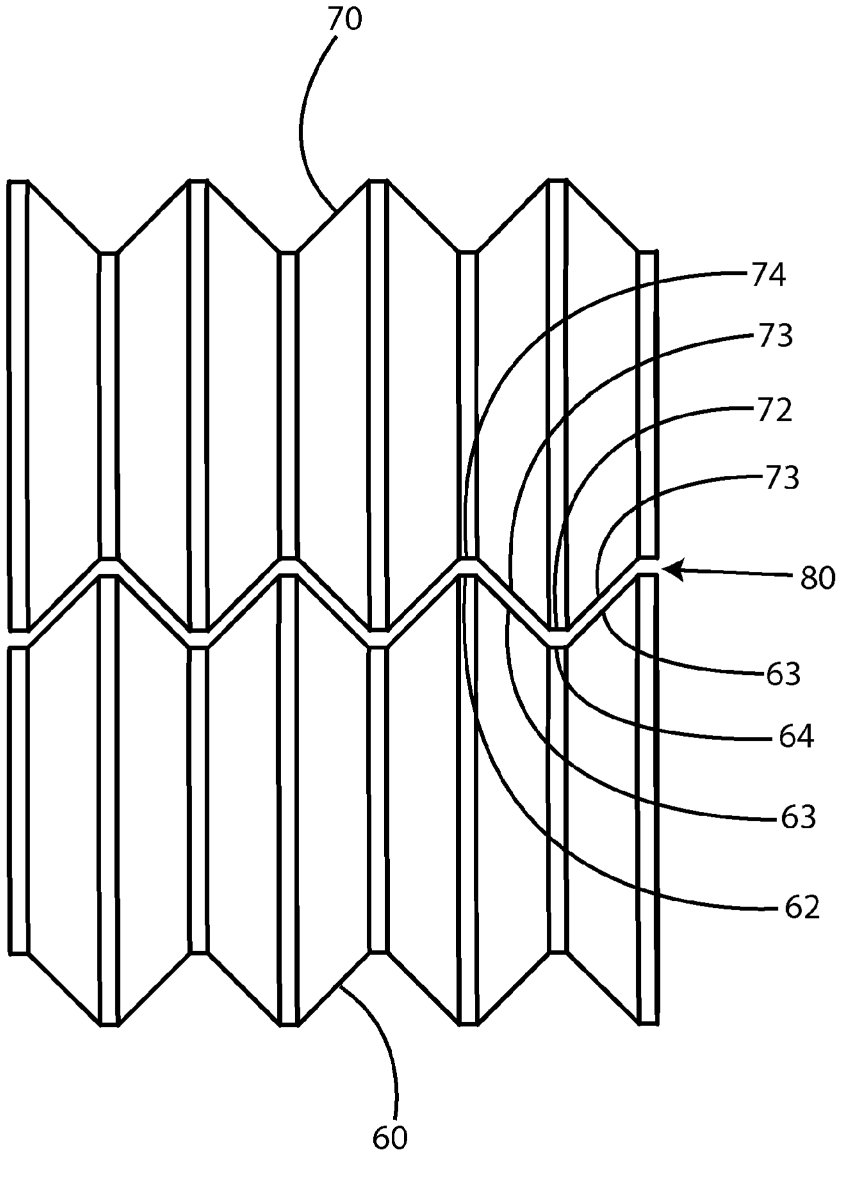
FIG. 6 shows a top view of the rollers.

FIGS. 5 and 6 show the driven roller 60 and idle roller 70 in isolation from the rest of the crusher. FIG. 5 gives a perspective view that allows the 3 dimensional form of the rollers to be appreciated whilst FIG. 6 provides an above view that allows the profile of the rollers and how they intermesh to be better appreciated. The rollers have a corrugated profile, which can be trapezoidal as shown or sinusoidal. The profiles of each roller are complementary, allowing them to intermesh with a uniform lateral gap 80 between them. The gap between the rollers is approximately 2 orders of magnitude smaller than the diameter of the rollers so cannot be discerned on a true scale drawing. FIG. 6 shows an exaggerated gap 80 for representational convenience. The corrugated profile has several consequences. The first is that the roller has a larger surface area over which crushing force is distributed allowing a higher throughput for a given length of roller. The corrugations also stop material migrating along the rollers as is the case with traditional rollers. The corrugated profile together with the gyratory motion provides additional comminution shearing mechanisms.

The driven roller 60 comprises a series of bottom flats 64, angled faces 63 and top flats 62. The idle roller 70 also comprises a series of bottom flats 74, angled faces 73 and top flats 72. The bottom flats of the driven roller intermesh with the top flats of the idle roller and vice versa; whilst the faces of each roller intermesh with each other. As the two rollers operate at different speed, the angled faces give rise to a shearing mechanism on the material between them with a steeper face producing finer particles. An angle of 30 degrees provides good results. Ideally there would be no flats between the faces, however some support of the faces is needed to prevent mechanical failure. Dividing the shaft length 50:50 between flats and faces is a good working compromise. The trapezoidal profile is however prone to uneven wear, with the outside corners likely to wear down first. Starting with rounded corners, or even a sinusoidal profile will help reduce uneven wear, but at the cost of increase manufacturing complexity.

An example crusher with rollers 250 mm in diameter and 400 mm long can achieve a throughput of 500 kg per hour, reducing 10 mm feed to 100 micron product using an idle roller eccentrically mounted by 0.1 mm to give a gyratory stroke of 0.2 mm. A 7.5 kW motor is used for the driven roller 60 and 5.5 kW motor for the idle roller shaft 71, with the driven roller driven at 15 rpm and the shaft of the idle roller driven at 1,500 rpm. The idle roller 70 will rotate in unison with the driven roller 60 due to the material between them and being rotatably mounted to the shaft 71, and also gyrates at 1,500 Hz due to being eccentrically mounted to the shaft 71.

The driven roller 60 and the idle roller 70 are 250 mm in diameter and set to operate with a nominal minimum gap of 0.0 mm to 1.0 mm. The idle roller eccentrically mounted on its supporting shaft 71 by 0.1 mm to 0.5 mm to give a 0.2 mm to 1.00 mm gyratory stroke to vary the crushing gap between a minimum of 0.0 mm and a maximum of 2.0 mm. To prevent 2.0 mm particles from passing through the gap the idle roller shaft rotates at approximately 100 times the speed of the driven roller to ensure all material passing through is subjected to a gyratory stroke, effectively making all material pass through the minimum gap. With a 100:1 speed ratio, the driven roller will rotate 3.6° for every rotation of the idle (gyratory) roller shaft. If the gyratory stroke occurred at the extreme of the 3.6°, the minimum gap will only increase by approximately 0.13 mm. A higher speed ratio will produce a better result. If the relative gyratory motion of the two rollers is produced by other means, for example relative movement of the fixed table and pivoting table then the ratio of the frequency of the gyratory stroke would need to the rotational frequency of the rollers would preferably be 100:1 or greater. The gyratory motion also serves to drag material through the crusher. In addition, the gyratory motion prevents the product forming into a ribbon, simplifying downstream processing. The gyratory motion and rotation speeds of the driven roller and idle roller and crushing gap can be adjusted to optimise crushing performance for many different feed materials.

In a conventional HPGR comminution is primarily achieved by compression in a single direction as the two rollers pinch together. In the present invention there is still comminution by compression, however this is augmented by pulsed compression and shear forces from the differential speed of the roller to produce further breakage mechanisms such as inter-particle compression, tensile failure and particle shear.

The invention provides a unique combination of mechanisms to perform comminution. Firstly, compression of the material due the gap between the rollers closing as the material is drawn through, leading to compressive failure of particles, breaking them into smaller pieces. Secondly, compression of the material due to the eccentric shaft closing the gap between the rollers. This is a cyclic process, as opposed to the aforementioned compression above which is steady in magnitude at any given location between the rollers. Thirdly, shearing of the material due to the opposing faces of the rollers between which a particle is located moving at different speed. A fourth mechanism is shear of material between the faces of the rollers due to the relative gyratory motion of the rollers. The extent and direction of the forces this will depend on the location of the particle as discussed below. At most locations between the rollers all of these mechanisms will be happening simultaneously. Additionally, the two compression mechanisms will induce compression in different directions on the particle simultaneously. It is this combination of mechanisms that make the invention unique.

Figure 7:
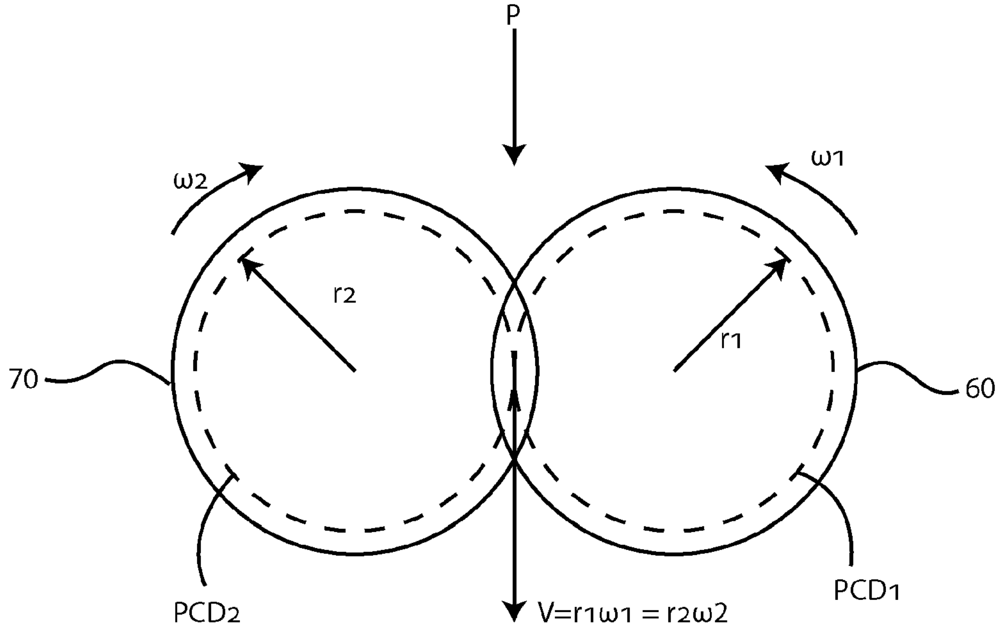
FIG. 7 provides a schematic end view of the two rollers to help with understanding of the comminution mechanisms FIG. 8 provides a top schematic view of the rollers showing particles in various positions A to E to help with understanding of the comminution mechanisms.

The exact forces operating on a particle will depend on the particles location in relation to the pitch circle diameter (PCD) and the sides and flats of the rollers. This can be explained with the aid of FIG. 7 which provides a schematic end view of the two rollers and FIG. 8 which provides a top schematic view of the rollers showing particles in various positions A to E. FIGS. 9A to 9E show the shear stress (τ) and normal stress (a) on a particle at positions A to E In the end view of FIG. 7 the fixed roller 60 is at the right. This roller is driven at a fixed rotational speed, ω1. The idle roller 70 freewheels—it is dragged along by the fixed roller due to friction of the material between the rollers (or by direct contact with the other roller if no material is present). At the pitch circle diameters ($PCD_1$, $PCD_2$) shown the linear speed V of both rollers is the same.

Figure 8:
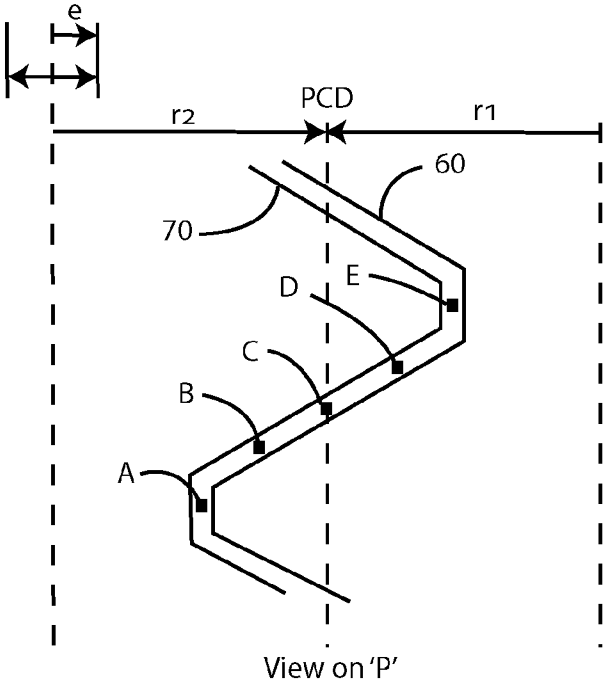
Figure 9A:
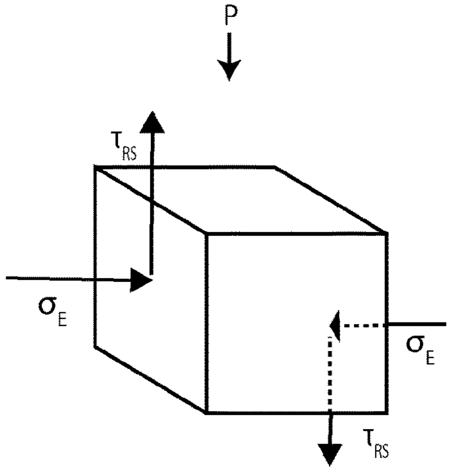
FIG. 9 illustrates the various stresses on particles in positions A to E.
Figure 9B:
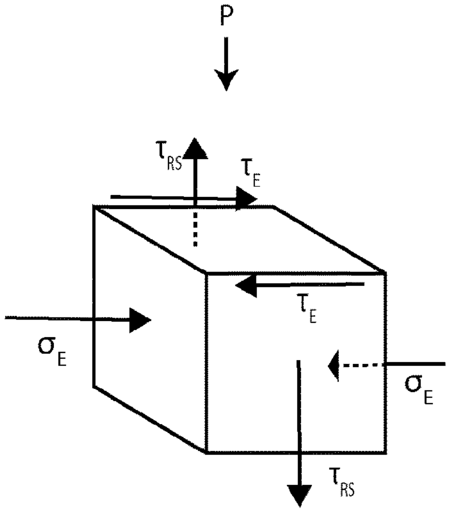
Figure 9C:
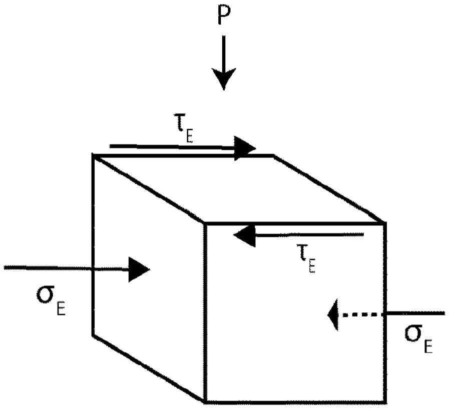
Figure 9D:
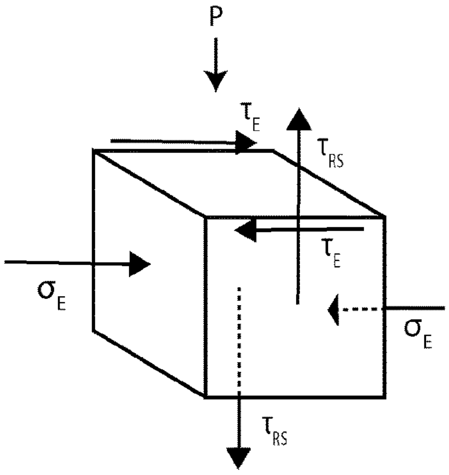
Figure 9E:
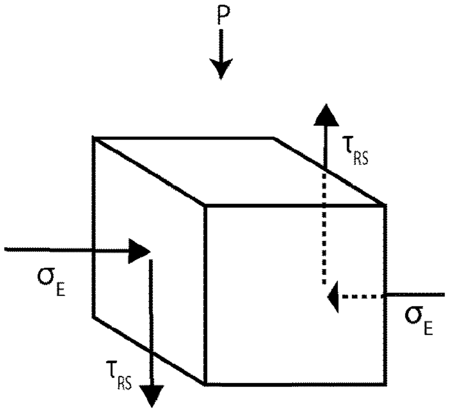

It should be noted that as the idle roller gyrates its axis is oscillating to the left and right in this view. This will cause the PCDs to vary also. FIG. 8 is a mid-plane view of FIG. 7 and shows the eccentric amplitude e by which the idle roller axis moves about its mid position.

Firstly, a normal stress $\sigma_E$ is shown. This is the compressive stress associated with the compression stroke of the eccentric shaft in the idle roller. This is the portion of time during which the idle roller is moving towards the fixed roller. There is also a shear stress $\tau_E$ associated with the compression stroke. This stress will also be present during the return stroke, if sufficient additional material is added between the rollers as the gap between them opens, but the shear stress direction will be reversed. There is also a shear stress $\tau_{RS}$ acting in an orthogonal direction from the differential speed of the rollers. The directions and magnitudes of the stresses will vary depending on the particle positions as shown. The shear stress from the compression stroke $\tau_E$ will only act when the particles are between the faces, i.e. positions B, C, D and not in the flats A and E. Particles at the PCD, i.e. position D will not experience shear stress $\tau_{RS}$ as there is no linear speed difference between the rollers.

The above stresses experienced by the material between the rollers is simplistic, an exact analysis of the stresses will be very complex for reasons including: other stresses will be present due to secondary effects (such as may be ascertained by reference to Mohr's circle); different materials may respond differently to the Newtonian linear model assumed by such simple analysis, so induced stresses may vary as a result; variation in roller speed due to gyration of the idle roller varying the PCD (this will be offset somewhat by the inertia of the rollers); the complex interactions of the material and the rollers with speed changes due to feed rate and material behaviour; and variation in the PCD position vary over the gyration period as the distance between the rollers varies.

Figure 10:
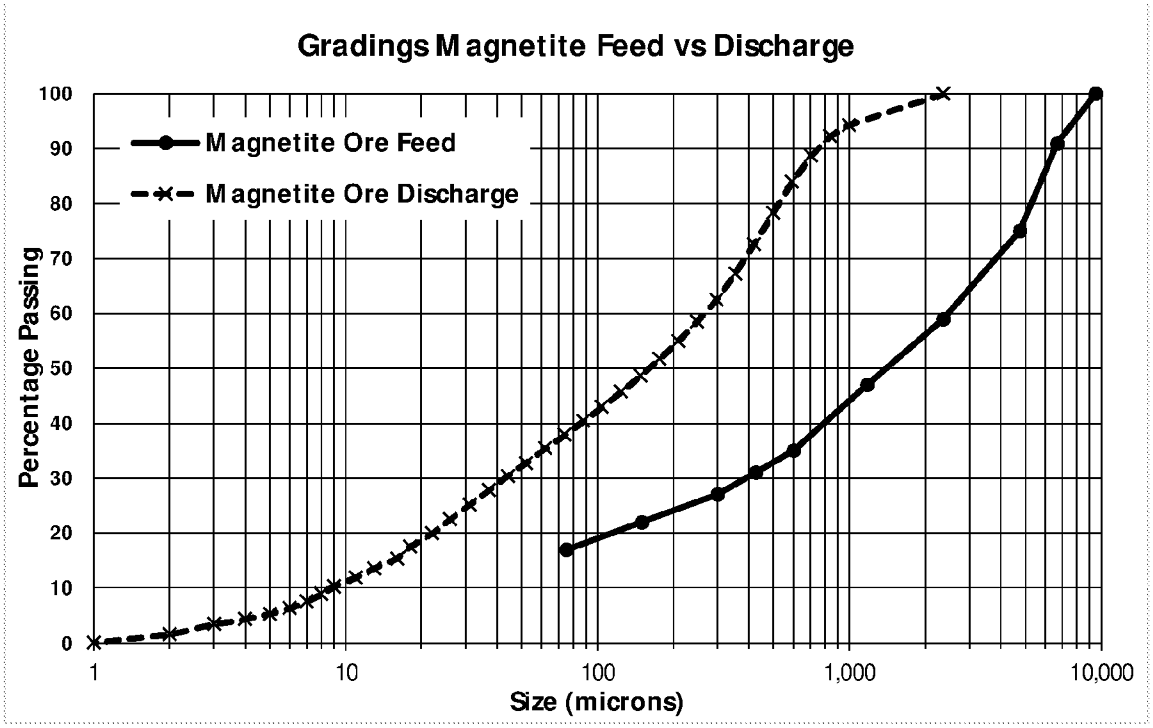
FIG. 10 is a gradings graph comparing feed and discharge sizes for an example crusher.

Tests of an implementation of the invention in line with the example parameters outlined previously were conducted on magnetite ore. FIG. 10 is a gradings graph comparing the feed and discharge. The results are summarised in Table 1 below which also compares the results with the results for a similar test carried out using a conventional High Pressure Grinding Rolls (HPGR) as reported by Baauwah et al (Minerals Engineering Volume 156 (2020) 106454). For the crusher of the invention a feed with an F80 of 5,200 μm was used and was reduced to a product with a P80 of 510 μm. This is an impressive reduction ratio RR80 of 10.2. In comparison, the HPGR reported by Baauwah et al was only able to achieve a RR80 of 1.82, reducing a feed with an F80 of 6,520 μm to a product with a P80 of 3,590 μm.

TABLE 1

Comparative Performance

| Crusher | F80 μm | F50 μm | P80 μm | P50 μm | RR80 | RR50 |
|---|---|---|---|---|---|---|
| Invention | 5,200 | 1,400 | 510 | 160 | 10.2 | 8.8 |
| HPGR | 6,520 | 3,260 | 3,590 | 1,270 | 1.82 | 3.98 |

The reader will now appreciate the present invention which provides a roller crusher with corrugated rollers and a gyratory action to give multiple crushing mechanisms to vastly improve crusher performance over conventional roller crushers.

Whilst the invention has been described with respect to a preferred embodiment in which a first roller is driven and a second roller idles and is given an eccentric motion, other embodiments are also feasible. Both rollers may be driven, the eccentric motion may be given to the driven roller instead of the idle roller, or the eccentric motion may be given to both rollers. The important feature is to have a relative gyratory motion between the rollers. This could even be achieved by moving the pivoting table back and forth with respect to the fixed table.

Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:

1. A roller crusher for the comminution of material, said roller crusher comprising;
- a first roller; and
- a second roller;
  - wherein each of the first roller and the second roller has a diameter and a longitudinal length;
  - wherein the first roller and the second roller are positioned in parallel with each other to define a crushing gap therebetween;
  - wherein each of the first roller and the second roller has a complementary corrugated profile which varies the diameter of the first roller and the second roller along the longitudinal length thereof, and wherein at least one of the first roller and the second roller is eccentrically mounted to an associated shaft to periodically vary the size of the crushing gap between the first roller and the second roller when at least one of the first roller and the second roller is rotating during operation, thereby inducing both compression and shear forces in the material.

2. The roller crusher as in claim 1, wherein the first roller is a driven roller and the second roller is an idle roller.

3. The roller crusher as in claim 2, further comprising a resilient mount to which the idle roller is mounted.

4. The roller crusher as in claim 1, wherein both of the first roller and the second roller are driven.

5. The roller crusher as in claim 1, wherein the first roller and the second roller rotate at a rotational frequency and wherein periodically varying the size of the crushing gap between the first roller and the second roller is at a frequency which is at least 100 times greater than the rotational frequency of the first roller and the second roller.

* * * * *